UNITED STATES PATENT OFFICE.

BRUCE FORD, OF JOHNSTOWN, PENNSYLVANIA, ASSIGNOR, BY MESNE ASSIGNMENTS, TO THE LORAIN STEEL COMPANY, OF OHIO.

INSULATING COMPOUND.

SPECIFICATION forming part of Letters Patent No. 621,807, dated March 28, 1899.

Application filed January 12, 1898. Serial No. 666,463. (No specimens.)

*To all whom it may concern:*

Be it known that I, BRUCE FORD, of Johnstown, in the county of Cambria and State of Pennsylvania, have invented a new and useful Insulating Compound, of which the following is a full, clear, and exact description.

The object of my invention is to provide a novel liquid insulating compound having certain advantages to be hereinafter pointed out.

The specific use for which I have intended this compound is to act as a seal in closed electric contact-boxes, switch-boxes, &c., to prevent moisture leaks from developing in the apparatus. Such a use of my improved compound is described and shown in the patent to Joseph N. Thomas, issued March 22, 1898, No. 600,937. The requisite qualities for a liquid insulator of this description are that it will not readily evaporate, that it will be of a specific gravity greater than water, so that when covering the electrical devices which are to be protected from moisture leaks any water which enters the receptacle whether from above or below, will rest upon the top of the insulating compound, and that it will not be liable to freeze at ordinary temperatures. The mixture which I prefer for this purpose is a mixture of solid asphalt and paraffin-oil in approximately the proportion of two parts, by weight, of the asphalt and one part, by weight, of the oil. To mix the ingredients, the paraffin-oil is preferably heated to the boiling-point and the asphalt is added in successive portions until the proper amount has been dissolved. After being thus dissolved, subsequent cooling will not separate the ingredients, as the asphalt is held in solution by the paraffin-oil.

Equivalent elements may be used; but, so far as I know, the mixture above mentioned is one to be preferred.

I have found paraffin-oil excellent for this purpose, for it is not readily oxidized, as would be the case with linseed-oil, nor does it evaporate quickly, as kerosene would do. A very viscous oil is not available, for in using it such a quantity thereof must be used to obtain a liquid product that the weight of the product is below that of water.

I have explained what proportion and what specific substances I deem preferable; but I do not limit myself to the specific substances and proportions described, for I believe that it is broadly new to provide such a mixture that the compound will be in a liquid form and will have the characteristics set forth.

Having thus described my invention, what I claim, and desire to protect by Letters Patent, is—

1. An insulating compound permanently liquid at normal temperatures, composed of a mixture of a solid asphaltic substance and an oil and having a specific gravity greater than that of water.

2. An insulating compound permanently liquid at normal temperatures, composed of a mixture of asphalt and oil.

3. An insulating compound for the purpose set forth comprising a mixture of asphalt and paraffin-oil in such proportions as to produce a liquid having a specific gravity greater than water.

4. The insulating compound composed of substantially two parts by weight of asphalt and one part by weight of paraffin-oil.

5. An insulating liquid heavier than water and composed of the mixture of an asphaltic solid and a substantially non-evaporating oil.

In testimony whereof I have affixed my signature in presence of two witnesses.

BRUCE FORD.

Witnesses:
RICHARD EYRE,
H. W. SMITH.